United States Patent
Birk et al.

(10) Patent No.: US 6,575,116 B1
(45) Date of Patent: Jun. 10, 2003

(54) APPARATUS FOR AUTOMATICALLY MILKING AN ANIMAL

(75) Inventors: Uzi Birk, Huddinge (SE); Thomas Nilsson, Enhorna (SE); Martin Rogersson, Stockholm (SE); Anders Bjork, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/744,401

(22) PCT Filed: Jul. 23, 1999

(86) PCT No.: PCT/SE99/01304

§ 371 (c)(1),
(2), (4) Date: Jul. 16, 2001

(87) PCT Pub. No.: WO00/04766

PCT Pub. Date: Feb. 3, 2000

(30) Foreign Application Priority Data

Jul. 24, 1998 (SE) ................................................. 9802611

(51) Int. Cl.⁷ .................................................. H01J 5/04
(52) U.S. Cl. ................................................... 119/14.48
(58) Field of Search .................. 119/14.03, 14.08, 119/14.1, 14.05, 14.02

(56) References Cited

U.S. PATENT DOCUMENTS

| | | | | |
|---|---|---|---|---|
| 4,805,559 A | * | 2/1989 | Van der Lely et al. .... | 119/14.1 |
| 5,778,820 A | * | 7/1998 | van der Lely et al. .... | 119/14.02 |
| 5,918,566 A | * | 7/1999 | van den Berg .......... | 119/14.02 |
| 6,009,833 A | * | 1/2000 | van der Lely .......... | 119/14.02 |
| 6,041,736 A | * | 3/2000 | van den Berg et al. ... | 119/14.02 |
| 6,116,188 A | * | 9/2000 | van der Lely .......... | 119/14.02 |
| 6,205,949 B1 | * | 3/2001 | van den Berg ......... | 119/14.02 |
| 6,227,142 B1 | * | 5/2001 | Birk ....................... | 119/14.08 |
| 6,244,215 B1 | * | 6/2001 | Oosterling .............. | 119/14.02 |
| 6,269,766 B1 | * | 8/2001 | Birk ....................... | 119/14.02 |
| 6,363,883 B1 | * | 4/2002 | Birk ....................... | 119/14.08 |
| 6,386,141 B1 | * | 5/2002 | Forsen et al. ........... | 119/14.08 |
| 6,394,028 B1 | * | 5/2002 | Birk ....................... | 119/14.02 |

FOREIGN PATENT DOCUMENTS

| | | |
|---|---|---|
| DE | 41 13 700 | 10/1992 |
| EP | 0 532 066 | 3/1993 |
| EP | 0 560 438 | 9/1993 |
| EP | 0 565 189 | 10/1993 |
| EP | 0 647 392 | 4/1995 |

* cited by examiner

Primary Examiner—Thomas Price
(74) Attorney, Agent, or Firm—Young & Thompson

(57) ABSTRACT

An apparatus for automatically milking an animal, comprising at least one teatcup having a teat entrance end (17a), and a movable arm (6, 40) for moving the teatcup toward a teat of an animal to be milked and attaching it thereto. The teat entrance end of the teatcup is arranged, while being moved by the movable arm (6, 40) toward the teat, to be held in relation to the movable arm (6, 40) at a level which is different from that of the teat entrance end (17a) of a further teatcup, when held in relation to the movable arm.

19 Claims, 5 Drawing Sheets

APPARATUS FOR AUTOMATICALLY MILKING AN ANIMAL

TECHNICAL FIELD OF THE INVENTION

The present invention relates to an apparatus for automatically milking an animal comprising at least one teatcup having a teat entrance end, and a movable arm for moving said teatcup towards a teat of an animal to be milked and attaching it thereto.

BACKGROUND OF THE INVENTION

An apparatus of this kind is known from WO 90/07268, which suggests that teatcups are brought to the teats of a cow by means of a robot arm. The teatcups are moved one at a time by means of the robot arm under the belly between the front and rear legs of the cow, and rearwards towards the udder.

An object of the invention is to improve the success rate of teatcup attachment.

This has been obtained by an apparatus of the initially defined kind, which is characterised in that the teat entrance end of said teatcup is arranged, while being moved by said movable arm towards said teat, to be held in relation to said movable arm at a level which is different from that of the teat entrance end of a further teatcup, when held in relation to said movable arm.

Hereby, it is not necessary to detach a teatcup on a front teat while re-attaching a teatcup, which has fallen off a rear teat in cases where the movable arm is moved towards the udder in a direction towards the rear of the cow.

Preferably, said movable arm is provided with an end portion, for holding a plurality of teatcups, wherein said at least one teatcup is held at a level, which is different from that of said further teatcup held by said end portion.

Suitably, said end portion is provided with a first part holding said at least one teatcup at a first level, and a second part holding said further teatcup at a second level. Hereby is achieved that the teatcups are allowed to be held at different levels.

Preferably, said first part of the end portion is arranged substantially parallel to said second part, said first and second parts being interconnected by an intermediate portion. Hereby, the teatcups are allowed to move between the different levels.

Suitably, said end portion is provided with a teatcup supplying means for moving a teatcup from said first part to said second part. Hereby, the teatcups are allowed to be actively moved between the different levels.

Preferably, said teatcup supplying means comprises a guide means and a supplying member, said supplying member being arranged to move at least one teatcup along said guide means towards said second part. In particular, said guide means comprises a pair of parallel guide members.

Suitably, said at least one teatcup and said further teatcup are arranged to co-operate with a connection means of said end portion in such a way, that they are held at different levels in relation to said end portion.

Preferably, said at least one teatcup and said farther teatcup are movable away from said end portion, independently from one another.

Suitably, said at least one teatcup has a longitudinal extension, and said further teatcup has a longitudinal extension, the longitudinal extension of said at least one teatcup being different from the longitudinal extension of said further teatcup. Hereby, different lengths of the teatcups are achieved.

Preferably, said at least one teatcup and said movable arm are provided with an identification means for allowing establishment of the identity of said at least one teatcup. Hereby, it is possible to determine which teatcup is to be or has been attached to a teat.

In particular, said at least one teatcup is provided with a bar code, and said movable arm is provided with a laser reader for reading said bar code. Hereby, a quick identification of the teatcup is achieved.

Suitably, said at least one teatcup is connectible to a vacuum source, a teat cleaning means being adapted to be connected at the teat entrance end of said at least one teatcup by means of a vacuum prevailing in the teatcup. Hereby, a teat cleaner is allowed to be fetched by the movable arm without the use of a gripper.

Suitably, the teat entrance end of said at least one teatcup is arranged at a higher level that the teat entrance end of the further teatcup, as seen in a vertical plane. Hereby, it is possible to apply a teatcup onto a rear teat, when a front teat has a teatcup attached thereonto.

Preferably, said movable arm is a service arm, which supplies one or more teatcups to a desired position, for allowing a robot arm with a gripper to grip a teatcup.

Alternatively, said movable arm is a robot arm.

Suitably, said robot arm is provided with laser sensor. Hereby, the position of a teat is possible to be located.

In particular, said laser sensor comprises a laser transmitter for forming a line, such as a scanning laser beam or a stable or scanning laser plane, and a laser reader, such as an image capturing device.

Suitably, said laser reader is adapted to read bar codes. Accordingly, the location of a teat and the identity of a teatcup with applied bar-codes is possible to be established by means of the same laser sensor.

DRAWING SUMMARY

DETAILED DESCRIPTION

Figure 1:
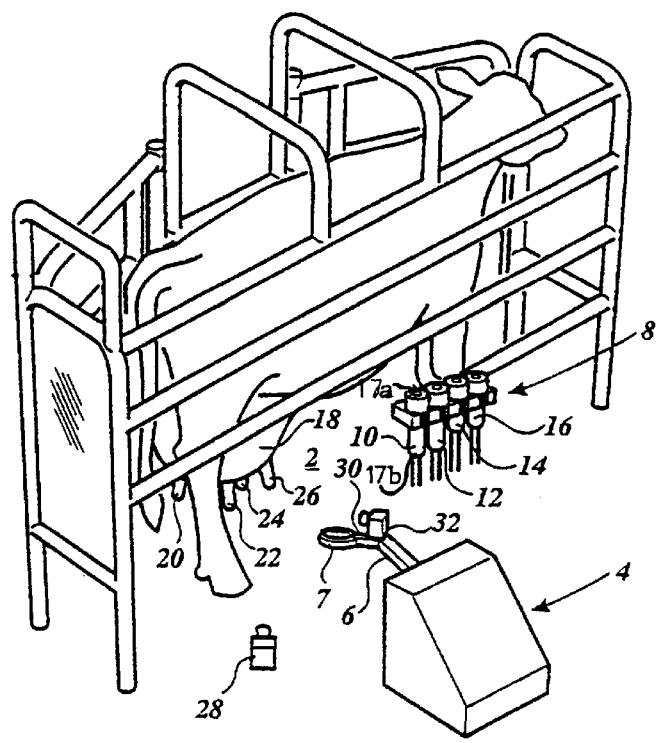
FIG. 1 is a perspective view of an animal stall provided with a milking robot.

FIG. 1 shows robot milking stall 2 provided with a milking robot 4 having a movable arm in form of a robot arm 6 with a gripping means 7 adapted to grip one teatcup. A teatcup rack 8 is provided with four teatcups 10, 12, 14, 16, each teatcup having a teat entrance end 17a and a milk exit end 17b. According to a first embodiment of the invention, two teatcups 10, 12 thereof are of the same or similar length, while two other teatcups 14, 16—of the same or similar length—are shorter than the other two teatcups 10, 12.

An udder 18 of a cow has rear teats 20, 22, and front teats 24, 26. The robot arm shown in FIG. 1 is intended to bring the teatcups 10, 12, 14, 16 under the belly and between the front and rear legs of a cow. In this case, the teatcups 10, 12 are to be attached to the rear teats 20, 22, whereas the teatcups 14, 16 are to be attached to the front teats 24, 26, for reasons that will be apparent below.

An image capturing device 28, such as a digital video camera is arranged on the side of the stall 2, for viewing at least the udder 18 of the cow, before, during and/or after teatcup attachment.

The robot arm 6 is provided with an angular end portion 30, which is provided with a teat location means 32, in the form of a digital video camera and/or a laser sensor, and the gripping means 7. This allows for a movement of a teatcup towards the rear of the cow, while viewing in the same direction. The angular end portion may be e.g. perpendicular After optional cleaning of the teats, one of the longer teatcups 10 is attached to a rear teat 20. Then, the other one of the longer teatcups 12 is attached to the other rear teat 22. Subsequently, one of the two shorter teatcups 14 is attached to a front teat 24. Thereafter the other one of the shorter teatcups 16 is attached to the other front teat 26.

Alternatively, one of the longer teatcups 10 is attached to a rear teat 20. Then, one of the two shorter teatcups 14 is attached to a front teat 24. Then, the other one of the longer teatcups 12 is attached to the other rear teat 22 and thereafter the other one of the shorter teatcups 16 is attached to the other front teat 26.

Figure 2:
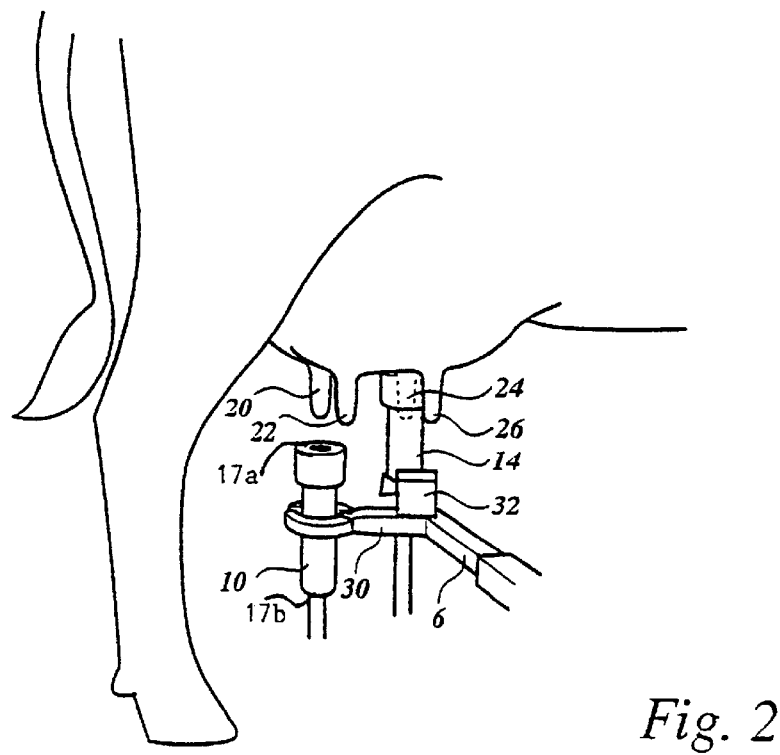
FIG. 2 illustrates a first embodiment of the invention.

FIG. 2 shows a situation where one of the longer teatcups 10 for some reason has fallen off one of the rear teats e.g. 20 and therefore (or for any other reason) has to be re-attached thereonto, while a shorter teatcup e.g. 14 is still attached to a front teat 24 in front of that rear teat 20. In this case, the longer teatcup is allowed to be re-attached to the rear teat 20 without having to first detach the teatcup 14, as the teat robot arm end portion 30 will be able to pass the short teatcup 14.

It should be noted that it would be possible to arrange the milking robot 4 behind the stall 2, in which case the robot arm 6 should be adapted to move each teatcup between the rear legs of the cow. Such a robot arm 6 should preferably be straight, rather than having an angular end portion 30. The longer teatcups 10, 12 are in that case to be attached to the front teats 24, 26 and the shorter teatcups 14, 16 to the rear teats 20, 22.

A further image capturing device 28 may be arranged on the opposite side of the stall 2 for viewing at least the udder 18 from that side.

Figure 3A:
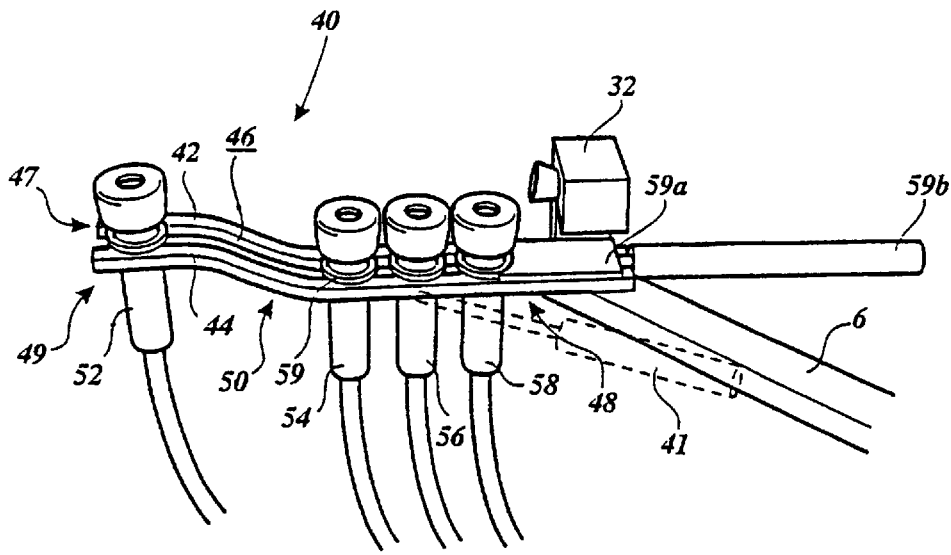
FIGS. 3A to 3C illustrate a second embodiment of the invention.

FIG. 3A illustrates a second embodiment of the invention, in which the teatcup rack 8 in FIG. 1 is substituted by a teatcup supply means 40 hingedly arranged on the robot arm 6. The teatcup supply means 40 constituting said movable arm is allowed to rotate about the hinge by means of a pneumatic or hydraulic cylinder 41. The teatcup supply means 40 is provided with a pair of parallel elongated members 42, 44, defining an intermediate elongated space 46. The members 42, 44 and the space 46 have a fork like configuration, i.e. the elongated space 46 has an open end 47. It should be noted that the cylinder 41 may be substituted by an electric step motor.

The members 42, 44 are furthermore formed to comprise a lower portion 48, an upper portion 49 and an intermediate portion 50. The upper portion 49 is adapted to house one teatcup 52, whereas the lower portion 48 is adapted to house a row of three teatcups 54, 56, 58, the four teatcups 52, 54, 56, 58 preferably—but not necessarily—being of the same length. The teatcups 52, 54, 56, 58 are provided with an annular flange member 59, which rests on the elongated members 42, 44, such that the teatcups are kept in the elongated space 46.

A conveying means 59a driven by a driving means 59b, in the form of a spring, an electric motor or a hydraulic or pneumatic cylinder, is adapted to push the teatcups towards the upper part 49. When the teatcup 52 is removed from the upper portion 49 the teatcups 54, 56, 58 will be pushed in a sliding movement towards the upper portion 49 via the intermediate portion 50.

The different levels of the teat supply means 40 allows for a re-attachment of a teatcup which has fallen off a teat without having to first detach a teatcup attached to a teat in front of the other teat, as the portion 49 will be able to pass the already attached teatcup.

If an attached teatcup still disturbs the movement of the teatcup supply means 40, it is simply turned about the hinge by means of the cylinder 41, until the attached teatcup can be passed.

Figure 3B:
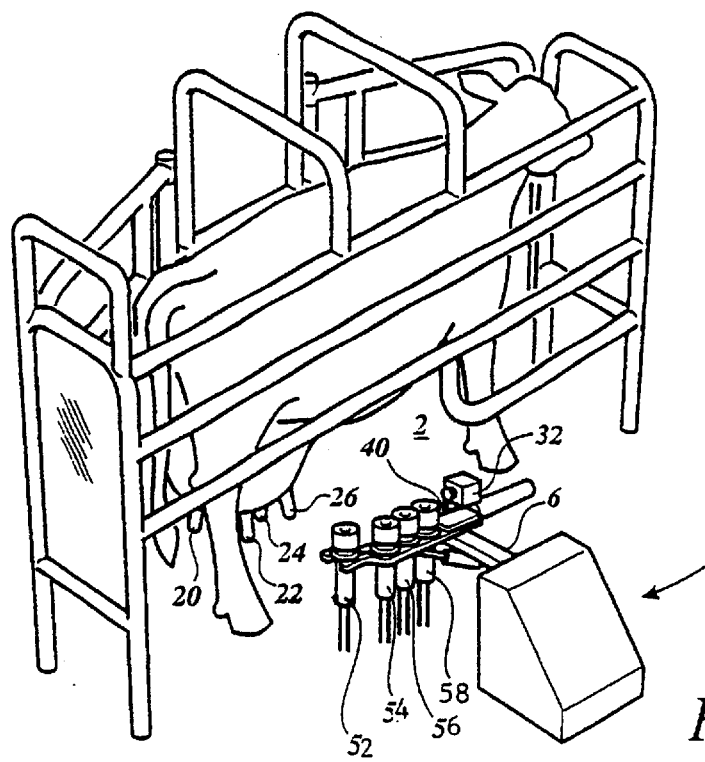

FIG. 3B illustrates a stall 2 provided with a milking robot 4 with the robot arm 6 and the teatcup supply means 40 shown in FIG. 3A. When the teatcup 52 has been attached to a teat, the robot arm 6 retracts the teatcup supply means 40 horizontally, away from the attached teatcup, which slides off the upper portion 49 via the open end 47. The conveying means 59a then pushes the three teatcups 54, 56, 58 on the lower portion 48 towards the upper portion 49, which results in that the teatcup 54 slides to the upper portion 49 via the intermediate portion 50. The conveying means is retracted again, if needed, such that the two remaining teatcups 56, 58, are kept on the lower portion 48.

The sequence is repeated until all the teatcups have been attached to the respective teats.

Figure 3C:
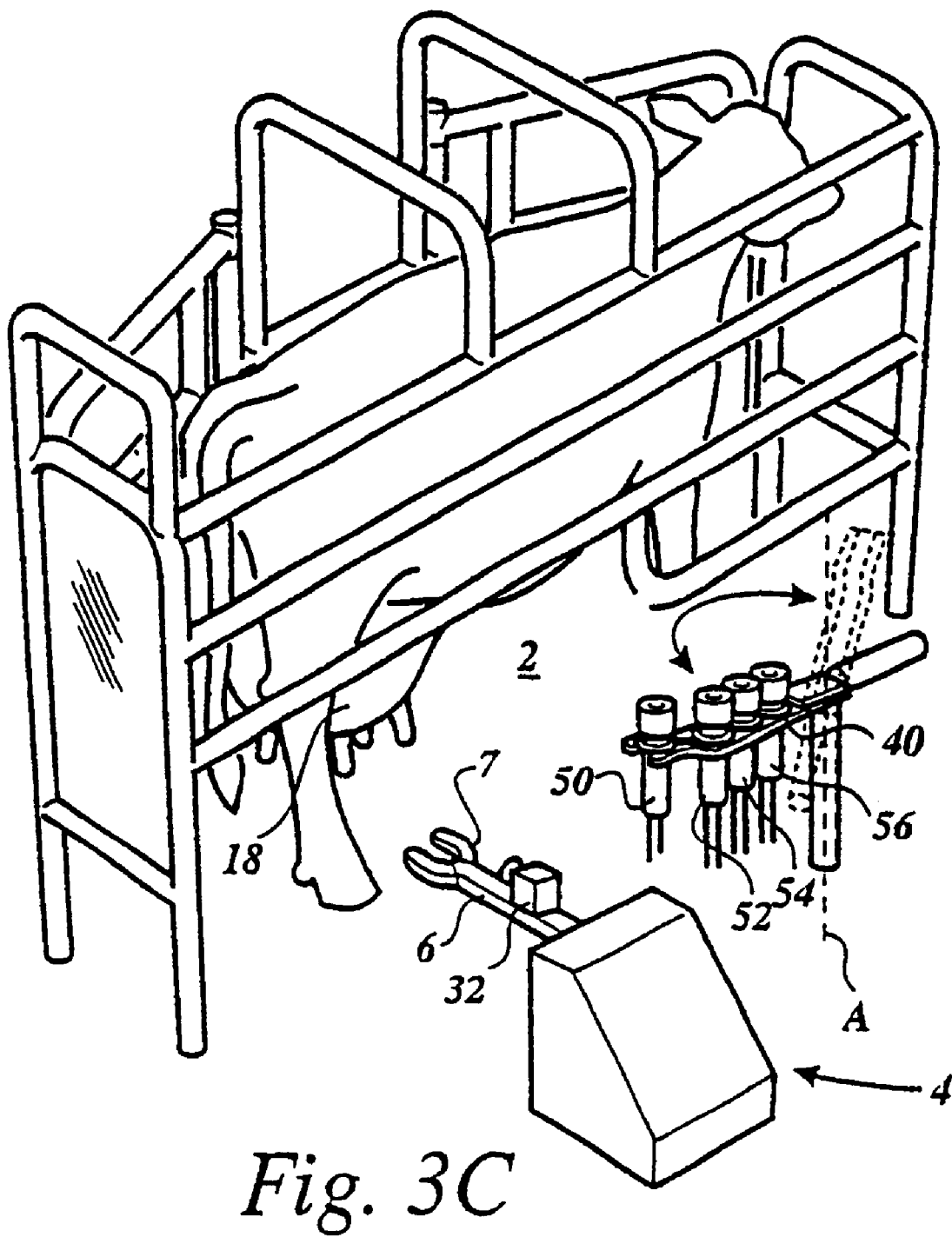

FIG. 3C illustrates the teatcup supply means 40 shown in FIG. 3A arranged as a service arm, which is hingedly arranged about a vertical axis A, and movable in a horizontal plane about the hinge to suitable positions (cf. the broken lines) by means of a not shown electric step motor or hydraulic or pneumatic cylinder, in the same manner as shown in FIG. 3A. The movement of service arm is controlled by a computer, which is associated with the teat location means 32 on the robot arm. Of course, a separate camera, as the one shown in FIG. 1, (reference numeral 28) may be used to view the movement of the service arm. The computer will then, of course, act in response to that camera, or in combination with the teat location means 32.

During teatcup attachment, the service arm supplies a teatcup at the udder 18. The teatcup is gripped by the gripper 7 of the robot arm 6, which has a straight end portion 30. The teatcups are simply slid off the end portion 47 by the robot arm 6 and attached to a suitable teat (cf. the embodiment according to FIGS. 3A and 3B). The next teatcup is slid to the upper portion 49 and the gripper 7 grips it—and also the subsequent teatcups—at substantially the same place in space as it gripped the previous teatcup. The need for moving the robot arm when fetching the teatcups is accordingly immensely reduced, which results in a quicker and safer teatcup attachment.

Figure 4A:
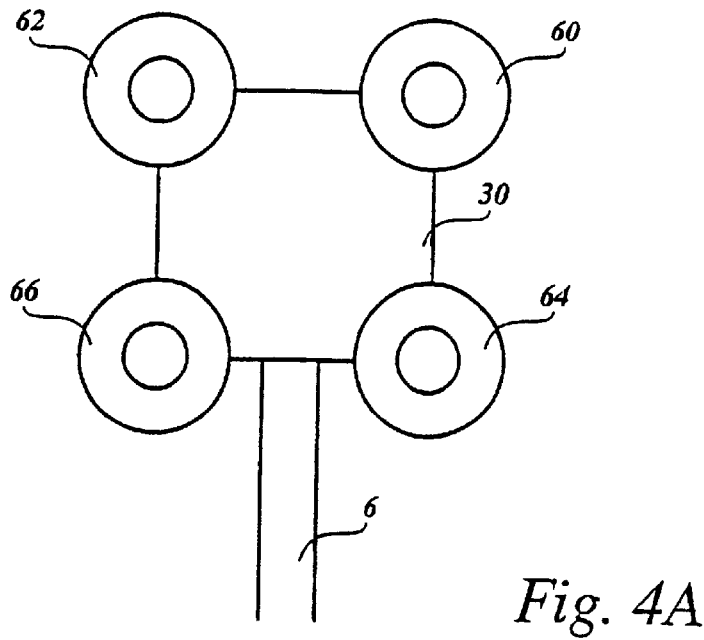
FIGS. 4A to 4C illustrate a third embodiment of the invention.
Figure 4B:
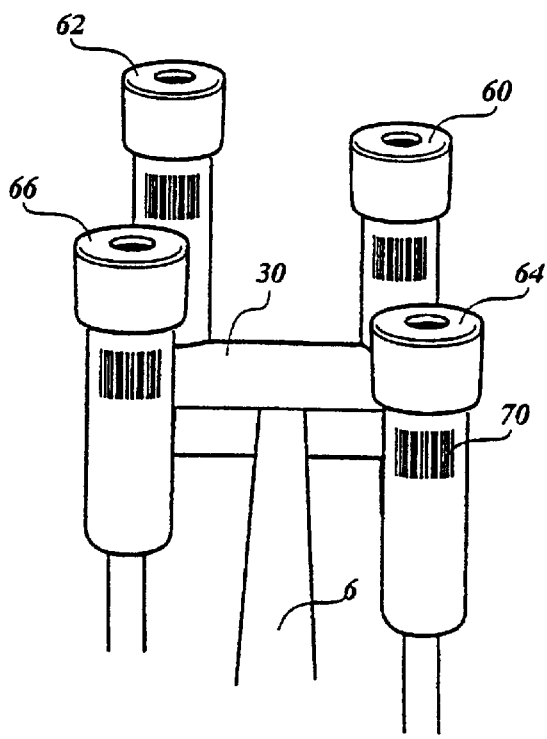
Figure 4C:
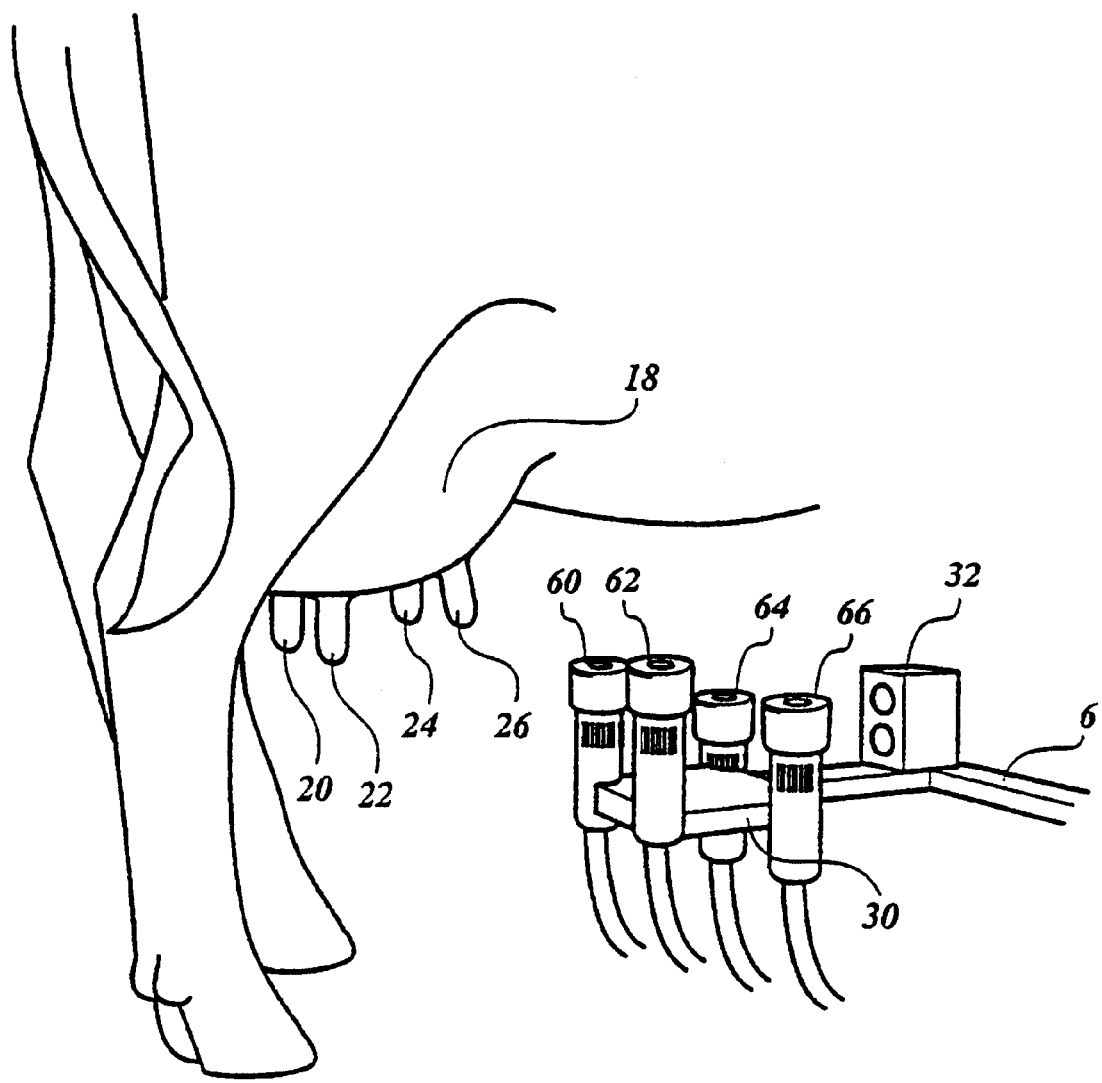

FIGS. 4A–4C show a third embodiment of the present invention, in which four teatcups 60, 62, 64, 66 are disengagably disposed in a vertically displaced relationship on the end portion 30. Each of the teatcups is provided with a bar code 70, for allowing identification thereof by means of a teat location means 32 in the form of a laser sensor (cf. FIG. 3C). The laser sensor is of the kind described in detail in WO 97/15900, and is furthermore able to read bar codes.

The teatcup 60 is to be attached to the rear teat 20 of the udder 18. For this purpose, the laser sensor 32 locates the position of the teat 20 and furthermore establishes the identity of the teatcup 60. It is desirable that none of the other teatcups is allowed to be attached to that teat, as it would cause troublesome further teacup attachment.

When the teatcup 60 has been attached to the teat 20, the teatcup is released from the end portion 30. The teatcup 62 is then ready to be attached to the teat 22.

After performed milking the teatcups are individually detached from the relevant teat and returned to the end portion 30 of the robot arm 6 by means of e.g. a cord (not shown).

The attachment of the teatcups 60, 62, 64, 66 to the end portion 30 may be performed by means of e.g. electromagnets (not shown) or vacuum nozzles (not shown).

What is claimed is:

1. An apparatus for automatically milking an animal, comprising at least one teatcup (60, 62, 64, 66; 52, 54, 56, 58; 10, 12, 14, 16) having a teat entrance end (17a), and a movable arm (6, 40) for moving said teatcup towards a teat of an animal to be milked and attaching it thereto, wherein the teat entrance end (17a) of said teatcup is arranged, while being moved by said movable arm (6, 40) towards said teat, to be held in relation to said movable arm (6, 40) at a level which is different from that of the teat entrance end (17a) of a further teatcup, when held in relation to said movable arm.

2. An apparatus according to claim 1, wherein said movable arm (6,40) is provided with an end portion (30), for holding a plurality of teatcups (52,54,56,58;–60,62,64,66), wherein said at least one teatcup is held at a level, which is different from that of said further teatcup held by said end portion (30).

3. An apparatus according to claim 2, wherein said end portion (30,49) is provided with a first part (49) holding said at least one teatcup (52,54,56,58;60,62,64,66) at a first level, and a second part (48) holding said further teatcup at a second level.

4. An apparatus according to claim 3, wherein said first part of the end portion (49) is arranged substantially parallel to said second part, said first and second parts (48,49) being interconnected by an intermediate portion (50).

5. An apparatus according to claim 4, wherein said end portion is provided with a teatcup supplying means (40) for moving a teatcup (52,54,56,58) from said first part to said second part.

6. An apparatus according to claim 5, wherein said teatcup supplying means comprises a guide means (42,44) and a supplying member (59a), said supplying member (59a) being arranged to move at least one teatcup (52,54,56,58) along said guide means towards said second part.

7. An apparatus according to claim 6, wherein said guide means comprises a pair of parallel guide members (42,44).

8. An apparatus according to claim 2, wherein said at least one teatcup (60) and said further teatcup (62,64,66) are arranged to co-operate with a connection means of said end portion (30) in such a way, that they are held at different levels in relation to said end portion.

9. An apparatus according to claim 8, wherein said at least one teatcup (60) and said further teatcup (62,64,66) are movable away from said end portion (30), independently from one another.

10. An apparatus according to claim 1, wherein said at least one teatcup (10,12,14,16) has a longitudinal extension, and said further teatcup has a longitudinal extension, the longitudinal extension of said at least one teatcup being different from the longitudinal extension of said further teatcup.

11. An apparatus according to claim 1, wherein said at least one teatcup and said movable arm are provided with an identification means (32,70) for allowing establishment of the identify of said at least one teatcup.

12. An apparatus according to claim 11, wherein said at least one teatcup is provided with bar code (70), and said movable arm is provided with a laser reader (32) for reading said bar code (70).

13. An apparatus according to claim 1, wherein the teat entrance end (17a) of said at lest one teatcup is arranged at a higher level that the teat entrance end of the further teatcup, as seen in a vertical plane.

14. An apparatus according to claim 1, wherein said movable arm is a service arm (40), which supplies one or more teatcups to a desired position, for allowing a robot arm with a gripper to grip a teatcup.

15. An apparatus according to claim 1, wherein said movable arm is a robot arm (6).

16. An apparatus according to claim 15, wherein said robot arm is provided with laser sensor (32).

17. Apparatus according to claim 16, wherein said laser sensor (32) comprises a laser transmitter forming a laser scanning beam and a laser reader.

18. Apparatus according to claim 17, wherein said laser transmitter forms a laser plane.

19. An apparatus according to claim 17, wherein said laser reader (32) is adapted to read bar codes (70).

* * * * *